3,013,004
PROCESS FOR AUTOMATIC CONTROL OF POLYMERIZATION REACTIONS BY MEASUREMENT OF COOLANT VAPOR VOLUME AND APPARATUS THEREFOR
Robert A. Koble and Fred T. Sherk, Bartlesville, Okla., assignors to Phillips Petroleum Company, a corporation of Delaware
Filed Sept. 12, 1957, Ser. No. 683,665
8 Claims. (Cl. 260—94.9)

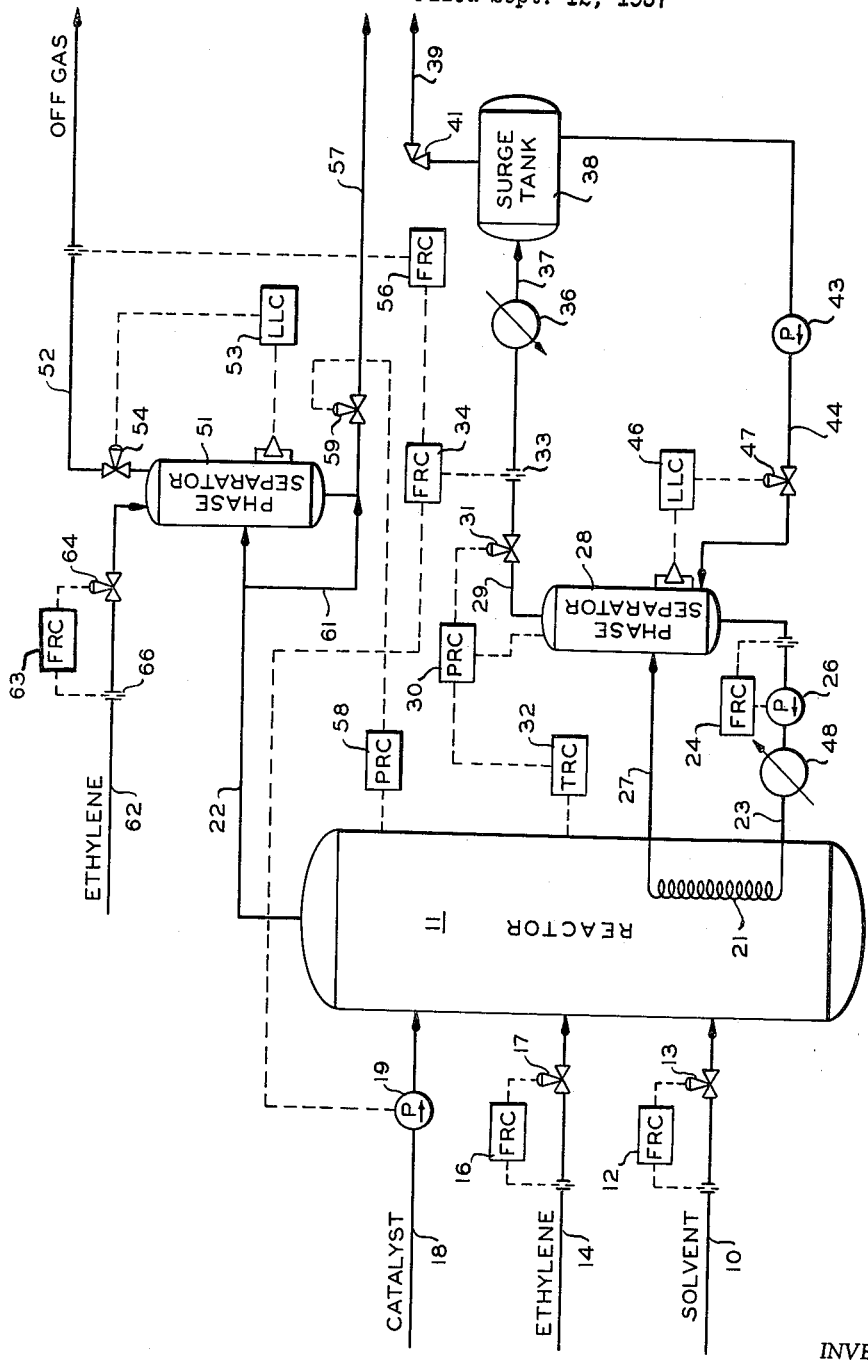

This invention relates to the control of polymerization reactions. In one aspect, it relates to a method for controlling a polymerization reaction so as to obtain a constant polymer production rate. In another aspect, it relates to a method for controlling the rate of addition of catalyst to a polymerization zone. In a further aspect, it relates to a system for controlling a polymerization process.

Various methods are described in the literature for producing normally solid and semi-solid polymers. For example, hydrocarbons, such as ethylene, propylene, isobutene, butadiene and styrene can be polymerized, either individually or in various admixtures with one another, to produce solid or semi-solid polymers. Recently considerable attention has been directed toward the production of solid olefin polymers, such as polymers of ethylene and/or propylene. The polymerizations are frequently carried out in the presence of a solid catalyst, utilizing a liquid solvent as the reaction medium. The polymerization reactions are exothermic so that it becomes necessary to provide for the removal of heat liberated by the reaction. The removal of the heat of reaction is frequently accomplished by employing a reactor system which is provided with an indirect heat exchange means through which a suitable coolant is circulated. One of the problems arising when using such a system relates to the control of the polymerization reaction so that a uniform product having desired properties may be produced at a constant production rate.

It is an object of this invention to provide an improved method for controlling polymerization reactions.

Another object of the invention is to provide means for controlling polymerization reactions.

Still another object of the invention is to provide a method for controlling the rate of catalyst introduction in a polymerization process so as to maintain a constant polymer production rate.

A further object of the invention is to provide a method for controlling the concentration of the monomer in a polymerization process.

A still further object of the invention is to provide a polymerization process whereby a polymer product having uniform properties is produced.

Other and further objects and advantages of the invention will become apparent to one skilled in the art upon consideration of the accompanying disclosure and the drawing which is a flow diagram illustrating a preferred embodiment of the invention.

As mentioned previously, an indirect heat exchange means is often employed to remove the heat of reaction of polymerization processes. While the polymerization reaction temperature can be controlled by adjusting the rate of circulation of the coolant through the indirect heat exchange means, such an adjustment is not always entirely satisfactory, for it fails to take into account various factors which may affect the polymerization reaction rate. Thus, it may become impossible, or at least impracticable, to control the reaction temperature merely by adjusting the coolant circulation rate. For example, the reaction temperature may change so rapidly as a result of changes in other process variables that it becomes impossible to supply coolant at a sufficient rate to maintain the reaction temperature desired. As a result, the reaction rate will fluctuate during conduct of the process, thereby rendering it difficult to obtain at a constant production rate a polymer product of uniform properties. In accordance with the instant invention, a method of control is provided which takes into consideration all the factors which may affect the reaction rate so that it is possible at all times to maintain close control over the polymerization reaction and thereby obtain a uniform polymer product at a fixed rate of production.

Broadly speaking, the instant invention resides in an improved method for controlling the rate at which one of the reactant materials, catalyst and polymerizable hydrocarbon, is introduced into a polymerization zone. The method comprises measuring the volume of coolant vapors evaporated as a result of a coolant being passed in indirect heat exchange with the reaction mixture in the polymerization zone, adjusting the rate of introduction of one of the reactant materials into the zone so as to maintain a fixed coolant evaporation rate, measuring the volume of undissolved, unreacted polymerizable hydrocarbon recovered from the zone, and changing the fixed coolant evaporation rate in response to the last-mentioned measurement.

In one embodiment, in a process which comprises charging as reactant materials, a slurry of polymerization catalyst in a solvent and a polymerizable hydrocarbon to a reaction zone, circulating a coolant through the reaction zone in indirect heat exchange with reaction mixture therein so as to maintain a substantially constant reaction temperature, and withdrawing from the reaction zone a polymer solution containing unreacted polymerizable hydrocarbon, the invention resides in the improvement which comprises measuring the volume of coolant vapors evaporated as a result of the indirect heat exchange, adjusting the rate of introduction of the slurry of polymerization catalyst so as to maintain a fixed coolant circulation rate, measuring the volume of undissolved, unreacted polymerizable hydrocarbon recovered from the reaction zone, and changing the fixed coolant circulation rate in accordance with the last-mentioned measurement.

The present invention is broadly applicable to polymerization processes in general, and more particularly to processes in which an olefin is contacted with a catalyst in suspension in a solvent. However, the invention is especially applicable for use in the production of polymers obtained according to the copending U.S. patent application of Hogan and Banks, Serial No. 476,306, filed December 20, 1954, now U.S. Patent 2,825,721. As set forth in this application in more detail, unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. The amount of chromium, as chromium oxide, in the catalyst can range from 0.1 to 10 or more weight percent. Although chromium contents as high as 50 weight percent are operative, amounts above 10 weight percent appear to have little added advantage for the polymerization of ethylene. However, for the polymerization of propylene and higher boiling olefins, chromium contents as high as 25 or 30 percent are often advantageous. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to 1500° F., preferably from about 900 to about 1000° F., for example, with a stream of a substantially anhydrous oxygen-containing gas, such as air. The olefin feed used for the polymerization is at least one olefin selected from the class of 1-olefins having a maximum of 8 carbon atoms per molecule and no branching nearer the double bond than the 4-position. Examples of such olefins are ethylene, propylene, 1-butene, 1-pentene, and 1,3-butadiene. Copolymers, such as ethylene-propylene copolymers and ethylene-butadiene copolymers, can be prepared by the described method. The polymerization can be effected at a temperature in the range 150 to 450° F. while the pressure can range from approximately atmospheric to as high as 1000 p.s.i.

A satisfactory method of conducting the polymerization as disclosed in the above-cited patent application comprises contacting an olefin with a slurry of catalyst in a hydrocarbon solvent which can exist as a liquid at the temperature of polymerization. In such a case, the reaction pressure need only be sufficient to maintain the solvent substantially in the liquid phase, and will ordinarily range from about 100 to about 700 p.s.i. The instant invention is particularly applicable to this type of operation, i.e., one in which an olefin is contacted with a catalyst slurry. When utilizing the control method of this invention with this type of process, it has been found to be desirable to operate at a temperature such that the polymer is substantially all in solution in the hydrocarbon solvent. This temperature will vary according to the particular solvent which is utilized, e.g., with paraffins between about 250 and 450° F., and with naphthenes between about 230 and 450° F. However, it is to be understood that the method can be used with processes carried out at temperatures such that the polymer produced is in undissolved solid form.

Suitable solvents for use in the above described process are hydrocarbons which are liquid and chemically inert under the reaction conditions. Solvents which can be advantageously used include paraffins, such as those having from 3 to 12, preferably from 7 to 9, carbon atoms per molecule, for example, 2,2,4-trimethylpentane (isooctane), normal hexane, normal decane, isopentane, and the like. Another class of solvents which can be used are naphthenic hydrocarbons having from 5 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. The described class of naphthenic hydrocarbons includes condensed ring compounds such as decalin and the alkyl derivatives thereof. A preferred subclass of naphthenic hydrocarbons within the above defined general class is constituted by those naphthenic hydrocarbons having from 5 to 6 carbon atoms in a single ring and from 0 to 2 methyl groups as the only substituents on the ring. Thus, the preferred naphthenic hydrocarbon solvents are cyclopentane, cyclohexane, methylcyclopentane, methylcyclohexane, the dimethylcyclopentanes, and the dimethylcyclohexanes.

Referring now to the drawing, there is shown a flow diagram which illustrates diagrammatically a preferred embodiment of the instant invention. While the invention is described with relation to a particular polymerization process, it is to be understood that it is not intended to so limit the invention. Thus, the invention is applicable to any polymerization process in which the material to be polymerized and catalyst are continuously supplied to a polymerization reaction zone. However, the invention is particularly applicable to a process in which a polymerizable hydrocarbon, such as an olefin, is contacted with a catalyst suspended in a solvent.

As shown in the drawing, a suitable solvent, such as cyclohexane, enters the system through inlet line 10. The rate of solvent introduction into reactor 11 is controlled by means of rate of flow recorder-controller 12 which is operatively connected to an orifice and to a flow control means, such as motor valve 13, in line 10. This recorder-controller and the control instruments referred to hereinafter are of a type well known in the art which are adapted to transmit a signal, such as a pneumatic signal, to a flow control means, such as a motor valve, which is thereby actuated so as to maintain a desired rate of flow of material. It is also within the scope of the invention to employ instruments in which the signal transmitted is an electrical signal. Inlet line 14 provides means for introducing a feed material, such as ethylene, into the system. The rate at which the ethylene is charged to the reactor is controlled by means of rate of flow recorder-controller 16 which is operatively connected to an orifice and to a flow control means, such as motor valve 17, in line 14. In practicing the instant process, it is generally preferred to adjust the rate of introduction of ethylene and cyclohexane so as to maintain in the reactor a small excess of undissolved ethylene in order to ensure completely saturation of the solvent with ethylene. While the amount of undissolved ethylene present in the reactor can vary within rather wide limits, for most efficient operation the actual amount of excess ethylene is quite small, e.g., from 1 to 5 parts in 100 parts of ethylene feed.

A catalyst, which preferably has a particle size of about 50 to about 100 mesh, is charged to the reactor through line 18. The catalyst is generally added to the reactor in the form of a slurry in the solvent. The catalyst can be, for example, a chromium oxide-silica-alumina catalyst prepared by impregnating a 90 weight percent silica and 10 weight percent alumina gel composite with chromium trioxide, drying and heating in air to obtain a catalyst composition containing approximately 2.5 weight percent chromium in the form of chromium oxide of which approximately half is in the form of hexavalent chromium. A pump 19 positioned in line 18 is operatively connected, as will be described more in detail hereinafter, to means for controlling the operation of the pump so as to adjust the rate of catalyst introduction.

Reactor 11 can be provided with a suitable stirring means to facilitate good contact between the reactant materials and to maintain the catalyst in suspension in the reaction mixture. A coil of heat exchange tubes 21, which is disposed within the reactor, provides means for removing heat from the vessel during the polymerization. The reaction vessel can be maintained, for example at 275° F. and 500 p.s.i. with the reaction time ranging from about 15 minutes to about 10 hours. The reactor effluent which is withdrawn through line 22 comprises a mixture of polymer, solvent, suspended catalyst, and unreacted ethylene. A part of the unreacted ethylene is dissolved in the solvent while another part is undissolved. As will become apparent hereinafter, the instant invention is particularly concerned with the amount of undissolved ethylene contained in the reactor effluent stream.

The reaction mixture contained in reactor 11 is maintained at the desired reaction temperature by circulating a coolant through heat exchange coil 21. As a coolant, it is preferred to utilize the same material which is employed as a solvent in the polymerization reaction. By using the same type of material, there is no problem of separation because of any leakage of coolant into the reactor. The coolant, which is introduced into the heat exchange coil through line 23, is circulated through the coil at a constant rate and enters the reactor at a constant temperature. The rate at which the coolant is introduced into the reactor is controlled by means of rate of flow recorder-controller 24 which is operatively connected to an orifice and to pump 26 in line 23. On entering the reactor, the coolant is preferably at its boiling point temperature in which case the heat removed from the reaction zone is that required to vaporize the coolant. However, it is to be understood that the coolant upon entering the reactor can be at a temperature below its boiling point so that heat required to raise the coolant to its boiling point is also removed from the reaction zone. In any case, it is necessary for the practice of the instant invention that the coolant in circulating through the reactor be raised to its boiling point and that at least some vaporization of the coolant occurs.

In circulating through the reactor, at least a portion of the coolant is evaporated, thereby removing heat from the reaction mixture. The amount of heat removed from the reaction mixture in this manner depends upon the actual coolant employed, the conditions in the coolant system, and the rate at which the coolant is circulated through the reactor. After circulating through heat exchange coil 21, the coolant is withdrawn therefrom through line 27. Thereafter, the recovered coolant stream comprising liquid coolant and coolant vapors is passed into coolant phase separation vessel 28. The liquid coolant collects in the bottom of the phase separator while the coolant vapors are taken overhead through line 29. The back pressure on the coolant system is controlled by means of pressure recorder-controller 30 which is operatively connected to phase separator 28 and to a flow control means, such as motor valve 31, in line 29. Pressure recorder-controller 30 has associated therewith a pneumatic set mechanism to which temperature recorder-controller 32 is operatively connected. The temperature recorder-controller is further operatively connected to reactor 11. Pressure recorder-controller 30 is initially given an index setting corresponding to the pressure which it is desired to maintain on the coolant system. This pressure also determines the temperature at which the coolant boils in the heat exchange coil. Temperature recorder-controller 32 is initially given an index setting corresponding to the temperature to be maintained in the reactor. If the reactor temperature rises above this index setting, a signal proportional to such rise is transmitted to the pneumatic set mechanism associated with pressure recorder-controller 30, which functions to change the index setting of the pressure recorder-controller. As a result of this change in its index setting, the pressure recorder-controller operates to change the opening of valve 31 so that the pressure on the system is decreased and the coolant boils at a lower temperature. When the reactor temperature drops below the index setting of temperature recorder-controller 32, the described apparatus functions in a converse manner to change the pressure on the coolant system so that the coolant boils at a higher temperature.

Line 29 connected to coolant phase separator 28 contains an orifice 33 which is operatively connected to rate of flow recorder-controller 34 which is further connected to pump 19 positioned in catalyst inlet line 18. It is also within the scope of the invention to use a flow control means, such as a motor valve, in place of pump 19. Furthermore, the signal from recorder-controller 34 can be employed to control the amount of solvent with which the catalyst is mixed to provide the catalyst slurry which is pumped into the reactor. The concentration of catalyst in the solvent and ultimately the amount of catalyst pumped into the reactor is controlled by adjusting the amount of solvent used to form the catalyst slurry. Rate of flow recorder-controller 34 in conjunction with orifice 33 provides means for measuring the volume of vapors passing through line 29 and for thereafter adjusting the operation of pump 19 in response to this measurement.

When a coolant is circulated through a reactor at a constant rate and at a constant temperature, it has been found that the amount of coolant which is evaporated in its circulation through the reactor is a direct indication of the polymerization reaction rate. Thus, when all reaction veriables are constant, a definite determinable amount of vapors passes through orifice 33 in line 29. However, if a change in catalyst activity occurs, a change in the polymerization reaction rate also takes place which is immediately evidenced by a change in the amount of coolant which is evaporated. More specifically, if the catalyst activity should decrease during the polymerization, the rate of heat evolution also falls off with the result that less of the coolant is evaporated. The change in the amount of coolant evaporated is immediately detected, and the amount of catalyst introduced into the reaction vessel is adjusted according to this change. Thus, recorder-controller 34 operates to increase the pumping rate of pump 19 in line 18 so as to allow additional catalyst to enter the reaction vessel. As a result of increased catalyst concentration in the reactor, the reaction rate increases and the heat evolution increases until the quantity of vapors passing through orifice 33 reaches a predetermined original value corresponding to the index setting given recorder-controller 34. When there is an increase in the amount of coolant evaporated, recorder-controller 34 operates through pump 19 to cut back on the catalyst feed rate.

After passing through orifice 33, the coolant vapors enter condenser 36 wherein they are condensed. Liquid coolant recovered from condenser 36 is passed by means of line 37 into coolant surge tank 38. Line 39 connected to the top of surge tank 38 and containing pressure relief valve 41 is provided for the removal of any gases from the system which may not have been condensed in condenser. Under ordinary conditions of operation, there will be at the most only a small amount of gas flowing from the surge tank through line 39. The coolant, which is pumped from the surge tank by means of pump 43, is then passed via line 44 into phase separation vessel 28. A liquid level controller 46, operatively connected to the separator and to a flow control means, such as motor valve 47, in line 44, provides means for maintaining a desired liquid level within the phase separator. Liquid coolant recovered from the bottom of phase separator 28 is withdrawn at a rate dependent upon the pumping rate of pump 26. As previously described, rate of flow of recorder-controller 24, operatively connected to an orifice in line 23 and to pump 26, functions to control the rate at which coolant is supplied to the reactor and subsequently circulated through the indirect heat exchange means associated therewith. Prior to passage into the reactor through line 23, the liquid coolant passes through heat exchange means 48 which regulates the temperature at which the coolant enters the reactor. It is generally preferred to control the temperature of the coolant so that it enters the reactor at its boiling point. It is within the purview of the invention to employ a temperature recorder-controller in conjunction with the heat exchanger which automatically adjusts the temperature of the coolant stream so that it enters the reactor at the desired temperature.

When controlling the rate of catalyst introduction by measuring the volume of evaporated coolant vapors as described hereinbefore, it has been found that changes in operating conditions often occur which alter the coolant vapor rate even though there actually has been no change in the polymerization reaction rate. Such changes in operation conditions from those existing when recorder-controller 34 was originally set as variations in the temperature of the ethylene or solvent feed streams, changes in concentration of catalyst deactivating materials in the feed streams, or sudden changes in ambient temperature result in a change in the coolant vapor flow without causing a change in the polymer production rate. For example, if a feed stream enters the reactor at a temperature different from that existing when recorder-controller 34 was set or if a sudden storm cools the atmosphere, the heat to be removed from the reaction by boiling of the coolant also changes. In order to compensate for such a change, it becomes necessary to change the index setting of rate of flow recorder-controller 34 in order that this instrument will call for an adjusted amount of coolant vapors.

In accordance with this invention, means are provided for automatically setting recorder-controller 34 in order to compensate for changing operating conditions. As previously mentioned, sufficient ethylene is introduced into reactor 11 so as to provide a known amount of undissolved ethylene in the reactor. Any change in operating conditions from those existing when recorder-controller 34 was given its original setting results in a change in the amount of undissolved ethylene present in the reactor. The reactor effluent comprising solvent, polymer, catalyst particles and unreacted ethylene is passed via line 22 into product phase separator 51 wherein the liquid materials collect in the bottom while the undissolved ethylene is taken overhead through line 52. The reactor effluent may also contain a small amount of inerts, such as ethane; however, the amounts of inerts remains substantially constant and is generally so small that their presence can be disregarded insofar as the instant invention is concerned. The conditions of temperature and pressure in the phase separator are substantially the same as those in reactor 11. As long as the same conditions prevail in the reactor system as existed when flow recorder-controller 34 was given its original setting, a constant, desired liquid level is maintained in phase separator 51. In other words, the amount of undissolved ethylene present in the reactor and in the reactor effluent stream remains constant. However, if the amount of undissolved ethylene in the effluent stream changes, the liquid level in phase separator 51 also changes. For example, if the amount of ethylene in the effluent stream is greater than the amount of undissolved ethylene which is to be maintained in the reactor, the amount of liquid material flowing through line 22 decreases and the liquid level in the phase separator drops. When the amount of undissolved ethylene in the reactor effluent stream is less than the desired excess of ethylene, the liquid level in the phase separator rises. Liquid level controller 53, operatively connected to phase separator 51 and to a flow control means, such as motor valve 54, in line 52 senses the change in liquid level and causes the opening of valve 54 to increase or decrease as applicable. Thus, when the liquid level in phase separator 51 drops below the desired level, the opening of valve 54 is increased, thereby allowing more gas to be withdrawn from the separator. When the liquid level rises above a predetermined level, the opening of valve 54 is caused to decrease, thereby cutting back on the amount of gas withdrawn from the separator. Such changes in the amount of unreacted ethylene recovered from phase separator 51 are in turn sensed by rate of flow recorder-controller 56 which is operatively connected to an orifice in line 52 and to a pneumatic set mechanism associated with rate of flow recorder-controlled 34. The pneumatic set mechanism operates to change the index setting of recorder-controller 34 in response to the measured changes in the amounts of undissolved ethylene recovered from phase separator 51. As a result of its new setting, rate of flow recorder-controller 34 now calls for a changed amount of coolant vapor which corresponds to the new operating conditions.

It is also within the scope of the invention to employ a summing device to add the signals supplied by flow recorder-controller 34 and flow recorder-controller 56. The resulting signal, which takes into consideration any change in operating conditions, can then be used to control the rate at which catalysts is supplied to the reactor. A suitable summing device is a Sorteburg Force Bridge as manufactured by Minneapolis Honeywell Co.

Line 57 provides means for withdrawing the product stream from phase separator 51. The rate at which this material is withdrawn is controlled by means of pressure recorder-controller 58, which is operatively connected to reactor 11 and to a flow control means, such as motor valve 59, in line 57. The product stream is thereafter passed to suitable processing equipment for separation of catalyst particles and solvent and recovery of a polymer product. While it has been indicated hereinabove that the entire stream recovered from the reactor through line 22 is passed into phase separator 51, it is within the scope of the invention to pass only a small proportion of this stream into the phase separator, the major proportion of the stream being by-passed through line 61. When operating in this manner, it is seen that the stream passed into the phase separator is a sample stream and the same results are obtained as described hereinbefore.

While it is preferred, as mentioned hereinbefore, to adjust the introduction of monomer and solvent so as to maintain a fixed amount of undissolved monomer in the polymerization zone, it is within the scope of the invention to operate so that the monomer concentration in the reaction mixture is at some point below saturation, e.g., 90 to 99 percent saturation. When operating in this manner, ethylene is introduced into the product phase separator through line 62. The rate at which ethylene is so introduced is controlled by means of flow recorder-controller 63 which is operatively connected to a flow control means, such as motor valve 64, and to orifice 66 in line 62. The index setting of flow recorder-controller 63 is correlated with the settings of controllers 12 and 16 so that the total amount of ethylene charged to the system is generally an amount in excess of that which would be sufficient to completely saturate the solvent if the ethylene were all fed to the reactor. For example if it is desired to operate so that the ethylene concentration is at 98 percent saturation, controllers 12 and 16 are then set so as to supply the required amounts of solvent and ethylene to give such a concentration. Controller 63 can then be set so as to add to phase separator 51 an amount of ethylene which, if added to reactor 11, would result in undissolved ethylene being present in the reactor, e.g., 5 percent above complete saturation. It is seen that as long as the ethylene concentration in reactor 11 remains at the desired amount below saturation, a constant amount of ethylene is taken overhead from the product phase separator through line 52. However, any change in the degree of ethylene concentration in reactor 11 results in a variation in the amount of ethylene taken overhead through line 52, which is immediately detected by rate of flow recorder-controller 52. This latter instrument then operates as described hereinbefore to change the index setting of recorder-controller 34. From the foregoing, it is seen that the effect of introducing ethylene into the product phase separator is to make it possible to operate in accordance with this invention when the ethylene concentration in the reaction mixture is at some point below saturation.

When the ethylene concentration in the reaction mixture is maintained at some point below saturation as described above, it also becomes possible to control the polymerization process by varying the ethylene feed rate rather than the catalyst feed rate. If operating in this manner, flow recorder-controller 34 is connected to a flow control means, such as a motor valve (not shown), in ethylene feed 14. The catalyst feed rate is then maintained at a desired constant rate by means of a rate of flow controller (not shown) which can be operatively connected to pump 19 in line 18.

When operating as preferred with a small excess of undissolved ethylene present in the reactor, ethylene feed line 62 functions as a safety device. Thus, line 62 provides means for charging ethylene to phase separator 51 when the liquid level in this vessel becomes too high. The phase separator can be conveniently provided with a high level alarm to indicate when the liquid level therein is too high. Ethylene can then be charged to the phase separator by manually operating a valve in line 62 or the alarm can be operatively connected to a motor valve in line 62 in order to provide for automatic operation. It is to be understood that introduction of ethylene in this manner induces a temporary error into the control system of this invention.

A more complete understanding of the invention can be obtained by referring to the following illustrative example which is not intended, however, to be unduly limitative of the invention.

Example

Ethylene is polymerized employing a reactor system similar to that illustrated in the drawing. The polymerization is carried out in the presence of a 60 mesh catalyst prepared by impregnating a 90 weight percent silica-10 weight percent alumina coprecipitated gel composite with an aqueous solution of chromium trioxide, drying and heating for several hours in a stream of anhydrous air at about 950° F. The polymerization is conducted by contacting the ethylene with the catalyst in the form of a slurry in cyclohexane. Cyclohexane is also employed as the coolant in the polymerization reaction.

A slurry of the above-described catalyst in cyclohexane is charged to the reactor at the rate of 34.8 pounds of catalyst and 311.3 pounds of cyclohexane per hour. An ethylene feed stream containing 95 percent ethylene is injected into the reactor at the rate of 1456 pounds per hour. The solvent cyclohexane is charged to the reactor at the rate of 8859 pounds per hour. The pressure within the reactor is 450 p.s.i.a. while the reaction temperature is maintained at 285° F. by circulating cyclohexane in indirect heat exchange with the reaction mixture. The coolant cyclohexane, which is at a temperature of about 285° F. and a pressure of 40 p.s.i.a. is circulated through the reactor at the rate of 41,100 pounds per hour. The reactor effluent, which is recovered from the reactor, is passed to a product phase separator from which 8 pounds per hour of off gas are taken overhead. The conditions of temperature and pressure in this phase separator are about the same as those existing in the reactor. The off-gas contains 5 pounds of ethylene, 1 pound of ethane and other inerts, and 2 pounds of solvent. From the bottom of the product phase separator, a stream is recovered at the rate of 10,653 pounds per hour. This stream contains 830 pounds of polymer, 548 pounds of dissolved ethylene and 34.8 pounds of catalyst. The stream recovered from the bottom of phase separator is then passed to suitable means for separating polymer, cyclohexane, catalyst and unreacted ethylene.

The coolant cyclohexane in circulating through the reactor removes heat from the reaction mixture as a result of evaporation of the cyclohexane. A coolant stream containing liquid and vaporous cyclohexane is then passed into the coolant phase separator. The coolant phase separator is at a temperature of 245° F. and a pressure of 40 p.s.i.g. The liquid cyclohexane settles to the bottom of the phase separator while cyclohexane vapors are taken overhead and passed through an orifice at the measured rate of 8230 pounds per hour. Thereafter, the vapors are introduced into a condenser wherein they are condensed and then passed into a coolant surge tank. Liquid cyclohexane recovered from the coolant surge tank is combined with that in the phase separator and then passed into the reactor for circulation through the indirect heat exchange means as previously described. Prior to introduction of the coolant into the reactor, it is passed through a heat exchanger wherein its temperature is adjusted so that it enters the reactor at 285° F. The rate at which the coolant is introduced into the reactor is also controlled so that it is charged to the reactor at the rate of 41,100 pounds per hour.

During operation of the process as described hereinabove, a drop in the liquid level in the product phase separator occurs, which is immediately detected by the liquid level controller. This drop in liquid level indicates that a change has occurred in the amount of undissolved ethylene desired to be maintained in the reactor as a result of a change in conditions from those existing when the set point of the controller-recorder, operatively connected to the orifice in the overhead line from the coolant phase separator, was originally established. This liquid level controller produces a pneumatic signal which causes the opening of the motor valve in the overhead line from the product phase separator to be increased. This valve adjustment permits an increased amount of off gas to be removed from the coolant phase separator. This change in the amount of the off gas is sensed by the rate of flow recorder-controller operatively connected to the orifice contained in the overhead line from the product phase separator and the pneumatic set mechanism associated with the first-mentioned rate of flow recorder-controller. The pneumatic set mechanism in response to the pneumatic signal received operates to change the index setting of its associated recorder-controller so that this latter instrument now calls for an increased amount of coolant vapors corresponding to the changed operating conditions which resulted in a change (increase) in the amount of undissolved ethylene contained in the reactor. Thereafter, the last-mentioned recorder-controller operates to adjust the pumping rate of the pump contained in the catalyst feed line so that an increased amount of catalyst is introduced into the reactor which will maintain the desired amount of excess, undissolved ethylene in the reactor. The polymerization now proceeds at a desired reaction rate so as to obtain at a constant rate of production a product having uniform properties.

As mentioned hereinbefore, the control instruments utilized in the practice of the instant invention can be commercially available items of manufacture. For example, Bulletin 450 of the Foxboro Company, Foxboro, Massachusetts, describes a pressure recorder-controller, a liquid level controller, and a pneumatic set mechanism, which are suitable for use in the practice of this invention. In Bulletin 355 of the same company, there is illustrated a rate of flow recorder-controller which can be conveniently employed.

From the foregoing, it is seen that a novel method has been provided for controlling the reaction rate in a polymerization process. By providing a method and means for resetting the rate of flow recorder-controller as described hereinabove, it is possible to regulate all of the independent variables in the polymerization and thereby render it possible to maintain a fixed polymer production rate. It will be apparent to those skilled in the art that variations and modifications of the invention can be made from a study of the foregoing disclosure. Such variations and modifications are believed to be clearly within the spirit and scope of the invention.

We claim:

1. In a process which comprises charging to a reaction zone polymerization catalyst and exothermically polymerizable hydrocarbon as reactant materials and solvent for said hydrocarbon, said solvent being inert to the polymerization reaction and liquid under the reaction conditions, circulating a coolant through said reaction zone in indirect heat exchange with reaction mixture therein so as to maintain a substantially constant reaction temperature, withdrawing from said reaction zone, reaction mixture containing unreacted polymerizable hydrocarbon, and passing at least a portion of said mixture to a phase separation zone, the improvement which comprises measuring the volume of coolant vapors evaporated as a result of said indirect heat exchange; adjusting the rate of introduction of said catalyst, in response to and in inverse relation to the measurement of volume of coolant vapors so as to maintain a fixed coolant evaporation rate; measuring the volume of undissolved polymerizable hydrocarbon recovered from said phase separation zone; and changing said fixed coolant evaporation rate in response to and in direct relations to said last-mentioned measurement.

2. A process for polymerizing a polymerizable olefin hydrocarbon which comprises continuously introducing a polymerization catalyst into a polymerization zone; continuously charging an exothermically polymerizable olefin hydrocarbon and a solvent for said hydrocarbon into said zone, said solvent being inert to the polymerization reaction and liquid under the reaction conditions; recovering an effluent stream containing polymer product and undissolved unreacted polymerizable olefin hydrocarbon from said zone; circulating a coolant in indirect heat exchange with reaction mixture in said reaction zone, said coolant being at about its boiling point; withdrawing a coolant stream comprising liquid and vaporous coolant from said reaction zone; separating coolant vapors from said coolant stream; measuring the volume of coolant vapors separated from said coolant stream; adjusting the rate of introduction of said catalyst into said reaction zone in response to and in inverse relation to the measurement of volume of coolant vapors so that said coolant stream withdrawn from said reaction zone contains a fixed volume of coolant vapors; separating undissolved unreacted polymerizable olefin hydrocarbon from said effluent stream; measuring the volume of undissolved unreacted polymerizable olefin hydrocarbon separated from said effluent stream; and changing said fixed volume of coolant vapors in response to and in direct relation to said last-mentioned measurement.

3. The process of claim 2 in which said catalyst comprises a minor amount of chromium in the form of chromium oxide containing a substantial amount of hexavalent chromium, and associated with at least one oxide selected from the group consisting of silica, alumina, zirconia and thoria.

4. In a process wherein ethylene is polymerized in a reaction zone in admixture with at least one hydrocarbon selected from the group consisting of normally liquid paraffins and naphthenes in the presence of a catalyst comprising a minor amount of chromium in the form of chomium oxide containing a substantial amount of hexavalent chromium, and associated with at least one oxide selected from the group consisting of silica, alumina, zirconia and thoria, at a temperature in the range of about 150 to 450° F. and a pressure sufficient to maintain said hydrocarbon in the liquid phase, the improvement which comprises continuously introducing said ethylene, hydrocarbon, and catalyst into said reaction zone at predetermined rates; circulating a coolant in indirect heat exchange with reaction mixture in said reaction zone so as to maintain a predetermined temperature in said reaction zone; recovering a coolant stream comprising liquid and vaporous coolant from said reaction zone; separating coolant vapors from said coolant stream in a first separation zone; meansuring the volume of coolant vapors separated from said coolant stream; adjusting the rate of introduction of said catalyst into said reaction zone in response to and in inverse relation to the measurement of volume of coolant vapors so that said coolant stream withdrawn from said reaction zone contains a fixed volume of coolant vapors; recovering an effluent stream comprising polymer product, solvent and undissolved ethylene from said reaction zone; passing said effluent stream into a second separation zone; withdrawing a stream comprising polymer product and solvent from a lower portion of said second separation zone; withdrawing a gaseous stream containing said undissolved ethylene from an upper portion of said second separation zone; measuring the volume of gases in said gaseous stream; and changing said fixed volume of coolant vapors in response to and in direct relation to said last-mentioned measurement.

5. In a process wherein ethylene is polymerized in a reaction zone in admixture with at least one hydrocarbon selected from the group consisting of normally liquid paraffins and naphthenes in the presence of a catalyst comprising a minor amount of chromium in the form of chromium oxide containing a substantial amount of hexavalent chromium and associated with at least one oxide selected from the group consisting of silica, alumina, zirconia and thoria, at a temperature in the range of about 150 to 450° F. and a pressure sufficient to maintain said hydrocarbon in the liquid phase, the improvement which comprises continuously introducing said ethylene, hydrocarbon, and catalyst into said reaction zone at predetermined rates, said ethylene and said hydrocarbon being introduced at rates such that the ethylene concentration in said reaction zone is a fixed amount below saturation; circulating a coolant in indirect heat exchange with reaction mixture in said reaction zone so as to maintain a predetermined temperature in said reaction zone, recovering a coolant stream comprising liquid and vaporous coolant from said reaction zone; separating coolant vapors from said coolant stream in a first separating zone; measuring the volume of coolant vapors separated from said coolant stream; adjusting the rate of introduction of said catalyst into said reaction zone in response to and in inverse relation to the measurement of volume of coolant vapors so that said coolant stream withdrawn from said reaction zone contains a fixed volume of coolant vapors; recovering an effluent stream comprising polymer product and solvent from said reaction zone; passing said effluent into a second separation zone; introducing ethylene into said second separation zone at a rate at least equal to the amount necessary to completely saturate said solvent in said reaction zone; withdrawing a stream comprising polymer product and solvent from a lower portion of said second separation zone; withdrawing a gaseous stream containing ethylene from an upper portion of said second separation zone; measuring the volume of gases in said gaseous stream; and changing said fixed volume of coolant vapors in response to and in direct relation to said last-mentioned measurement.

6. In a polymerization reactor system comprising an enclosed reaction vessel, means for introducing catalyst into said reaction vessel, means for introducing solvent into said reaction vessel, means for introducing feed material into said reaction vessel, means for withdrawing reactor effluent from said reaction vessel, indirect heat exchange means associated with said reaction vessel, and coolant inlet means and coolant outlet means attached to said indirect heat exchange means, the improvement comprising, in combination, first means for measuring the volume of coolant vapors recovered from said indirect heat exchange means through said coolant outlet means; first flow control means in said catalyst introduction means; second flow means control in said feed material introduction means; third flow control means in said solvent introduction means; first rate of flow control means operatively connected to said first measuring means and said first flow control means; second means for measuring the volume of gases withdrawn from said reaction vessel through said reactor effluent withdrawal means; and second rate of flow control means operatively connected to said second measuring means and to said first rate of flow control means.

7. In a polymerization reactor system comprising an enclosed reaction vessel, means for introducing catalyst into said reaction vessel, means for introducing solvent into said reaction vessel, means for introducing feed material into said reaction vessel, means for withdrawing reactor effluent from said reactor vessel, indirect heat exchange means associated with said reaction vessel, and coolant inlet means and coolant outlet means attached to said indirect heat exchange means, the improvement comprising, in combination, a first gas-liquid separator, said coolant inlet means being attached to a lower portion of said first separator and said coolant outlet means being attached to an intermediate portion of said first separator; a first gas outlet means attached to an upper portion of said first separator; a first orifice positioned in said first gas outlet means; a first flow control means positioned in said catalyst introduction means; a second flow control means positioned in said feed material introduction means; a third flow control means positioned in said solvent introduction means; a first rate of flow controller having an index setting, said controller being operatively connected to said orifice and to said first flow control means; means for changing the setting of said index setting of said first rate of flow controller; a second gas-liquid separator, said reactor effluent withdrawal means being attached to an intermediate portion of said separator; a second gas outlet means attached to an upper portion of said second separator; a product outlet conduit means connected to a lower portion of said second separator; a second orifice in said second gas outlet means; a second rate of flow controller operatively connected to said second orifice and to said means for changing the setting of said index setting of said first rate of flow controller; a flow control means positioned in said second gas outlet means; and a liquid level controller operatively connected to said second separator and to said last-mentioned flow control means.

8. The reactor system of claim 7 in which a feed material inlet means is connected to said second gas-liquid separator.

References Cited in the file of this patent

UNITED STATES PATENTS

| | | |
|---|---|---|
| 2,518,307 | Groebe | Aug. 8, 1950 |
| 2,590,436 | Luten | Mar. 25, 1952 |
| 2,665,197 | Rowland | Jan. 5, 1954 |
| 2,714,101 | Amos et al. | July 26, 1955 |